March 3, 1964 B. UHLIG 3,122,838
INDICATING DEVICE AND ZERO ADJUSTMENT THEREFOR
Filed July 6, 1961
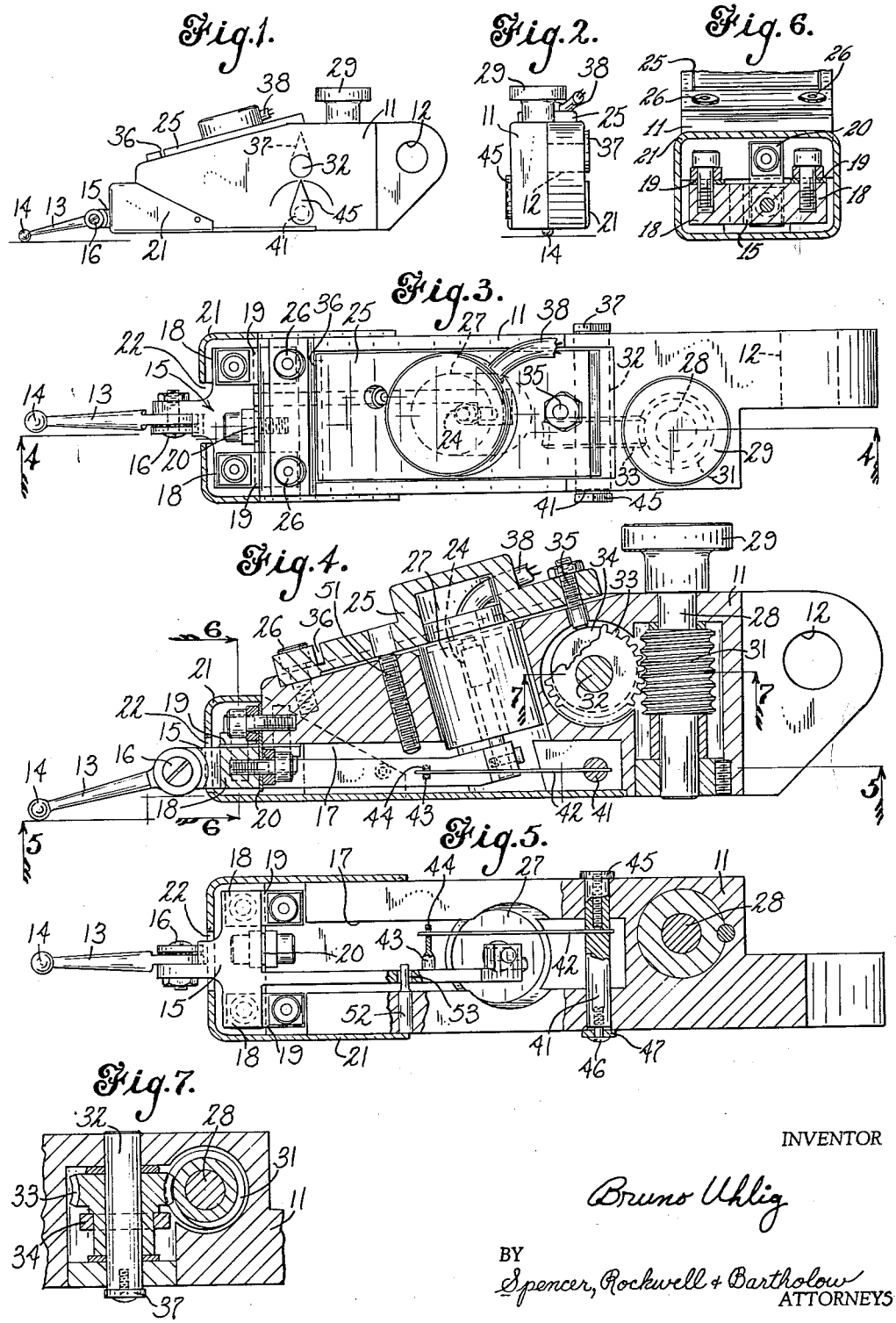
INVENTOR
Bruno Uhlig
BY
Spencer, Rockwell & Bartholow
ATTORNEYS

# United States Patent Office 3,122,838
Patented Mar. 3, 1964

3,122,838
INDICATING DEVICE AND ZERO ADJUSTMENT THEREFOR
Bruno Uhlig, West Hartford, Conn., assignor to Pratt & Whitney Company, Incorporated, West Hartford, Conn.
Filed July 6, 1961, Ser. No. 122,229
9 Claims. (Cl. 33—172)

This invention relates generally to an indicating device such as a height gage used for comparing a dimension of a work piece relative to a surface plate with the known dimension of gage blocks or of comparing dimensions of the piece using the gage blocks as a standard, or otherwise performing precision measuring operations based on a comparison with known dimensions. More particularly the invention relates to the novel construction of a height gage which provides an electrical signal which may be measured by a meter and thereby translated into a calibrated linear variation. The invention further relates to the novel construction of a zero adjustment mechanism for the gage and also to means for applying positive, neutral or negative gaging pressure at the gaging point as may be desired when approaching the work piece from various directions.

Height gages are well known to toolmakers, diemakers and others who are concerned with accurately checking or determining dimensions of machined or manufactured parts. Standard procedure for checking the height dimensions of a work piece against the dimensions called for in the drawing would be to place a height gage on a surface plate and set it to the required height against a set of gage blocks built up to the specified dimension. The height gage is then moved into contact with the work piece, which is also positioned on the surface plate, and the height gage indicator indicates the variation of the work piece dimension from the known dimension.

Some height gages have dial indicators directly thereon calibrated in thousandths which directly read the deflection of the height gage pointer. More accurate gages have been developed whereby the deflection of the height gage pointer causes a variation in the induced voltage in a transformer within the gage. The induced voltage may be read by a meter which also may be calibrated to read in thousandths, plus or minus, the lineal deflection being proportional to the variation in induced voltage. However, difficulty in zeroing this type of gage has been experienced when setting the gage to a known dimension using gage blocks. A further difficulty has been experienced in applying resistive pressure to the height gage pointer against vertical deflection in both directions to assure contact of the pointer with the work piece as it is moved therealong.

Accordingly, it is an object of this invention to provide a novel construction for an electrically readable height gage.

Another object of the invention is to provide a simple but accurate zero adjusting mechanism for an electrically readable height gage.

A still further object of the invention is to provide means whereby the gaging pressure of a height gage may be varied plus and minus in the vertical direction.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

Generally speaking, in accordance with this invention, a height gage having a contact pointer is mounted to the vertical post of a stand resting on a surface plate. The height gage unit is moved so that the contact pointer is brought generally into contact with a known height of gage blocks by moving the entire height gage assembly up and down along the vertical post. When the height gage is roughly zeroed as read on the calibrated meter, the gage is suitably secured to the post. Accurate zeroing of the gage may thus be effected by moving the secondary coils of a transformer in the height gage head with relation to a core whose movement is controlled by the contact pointer. The movement of the coils is accomplished by a camming arrangement controlled by an adjustment knob on the height gage head.

In addition, a positive, neutral or negative contact pressure may be applied to the contact pointer by means of a spring which acts upon a link connecting the contact pointed to the transformer core. The spring is adjustably secured in the height gage head and adjustment places predetermined amounts of pressure on the connecting link in either direction.

For a fuller understanding of the invention, reference is had to the following description taken in connection with the accompanying drawing, in which:

FIG. 1 is a right side elevational view of a height gage constructed in accordance with the invention;
FIG. 2 is a rear elevational view thereof;
FIG. 3 is a top plan view thereof;
FIG. 4 is an elevational view in section taken along line 4—4 of FIG. 3;
FIG. 5 is a bottom plan view in section taken along line 5—5 of FIG. 4;
FIG. 6 is a sectional view taken along line 6—6 of FIG. 4 showing the means for deflectably mounting the contact pointer;
FIG. 7 is a sectional view taken along line 7—7 of FIG. 4 showing the cam adjusting means in greater detail.

Referring now to FIGS. 1, 4 and 6, a body 11 is attached to a stand (not shown) through a mounting hole 12. A contact pointer 13 deflectably projects from the body 11 at the end thereof opposite to mounting hole 12. Contact pointer 13 is conically shaped and has a spherical portion 14 on one end thereof, which contacts the gage blocks or work piece to be measured. The opposite end of the contact pointer is pivotally mounted on a gaging lever 15 through a screw 16. The friction between contact pointer 13 and gaging lever 15 is applied by the tightening screw 16 which prevents relative rotation between the pointer and the lever unless a damaging blow is struck to the contact pointer. Under such conditions, contact pointer 13 would slip with relation to gaging lever 15 instead of causing an inordinate amount of deflection thereof.

Gaging lever 15 is positioned in a channel 17 cut in the bottom of body 11. A horizontal section through the gaging lever 15 shows it to be somewhat cross-shaped as may be seen in FIG. 5. The top of the cross would be the portion attached to contact pointer 13 while the bottom would be that within channel 17. Referring now to FIGS. 4 and 6, the upper horizontal faces of the legs 18 of the cross have attached thereto two reeds 19 which are also attached to the underside of body 11. A third reed 20 is attached to the front edge of body 11 and also to a lower vertical face of one of the legs 18 of gaging lever 15. In this manner, gaging lever 15 is attached to body 11 by means of one vertically disposed and two horizontally disposed reeds. A projection of the cross-sections of the reeds intersects at a horizontal line perpendicular to the center line of gage lever 15. The reeds, being made from spring steel or other suitable flexible material, allow gaging lever 15 to be deflected with relation to body 11 in the vertical direction only, the intersection of the reeds forming the pivot line. Horizontal forces placed on the gaging lever by contact pointer 13 will be limited by the reeds and not cause deflection of the lever. A shield 21 is attached to body 11 to protect the reed mounting and gaging lever 15 from exposure. A suitable opening 22 in shield 21 allows gaging lever 15 to project therethrough and is of a size sufficient to allow the gaging lever to be deflected without interference therewith. As may be clearly seen in FIG. 4, the innermost end of gaging lever 15 bends upwardly and has mounted thereon a core 24 whose use will be hereinafter described.

The top surfaces of body 11 extend horizontally from the rear and then slope downwardly toward the front. A cap 25 is placed on the sloping face of the top surface and is attached at the lower end thereof by screws 26 to body 11. Attached to cap 25 and slidably disposed in body 11 is a linear differential type transformer 27 of any well known construction, the core 24 forming a part thereof.

As more clearly shown in FIG. 7, a shaft 28 having a knob 29 secured fast thereto is rotatably mounted in body 11. Knob 29 is disposed above the top of body 11 so that it may be manually rotated. Fast to shaft 28 and disposed freely within body 11 is a worm 31. A shaft 32 is rotatably mounted and horizontally disposed in body 11. A worm gear 33 is mounted fast to shaft 32 and engages worm 31 as shown. Also mounted fast on shaft 32 adjacent worm gear 33 is a cam 34 which rotates with worm gear 33. An adjusting pin 35 is adjustably secured in cap 25 at the upper end thereof and slidably projects into body 11 to contact with the surface of cam 34. To permit adjustment of the position of cap 25 as will hereinafter be described, the cap is provided with a thin cutaway section 36 adjacent screws 26 which allows cap 25 to flex with relation to the section of the cap which is secured by screws 26. As seen in FIGS. 2 and 3, a pointer 37 is secured to shaft 32 adjacent the left side of body 11 to provide an external indicator for the position of cam 34.

The differential transformer 27 is constructed having a primary winding and two secondary windings. As core 24 moves with relation to the secondary windings, the voltage induced in one of the secondary windings will vary inversely with relation to the voltage induced in the other secondary winding. In other words, if core 27 enters the field of the second secondary winding to a greater extent than it is in the field of the first secondary winding, a larger voltage will be induced in the second secondary winding than in the first. Conversely, if core 27 moves into the field of the first secondary winding, the voltage induced in that winding will be greater. The voltage applied to the primary winding and taken off by the two secondary windings is transmitted through cable 38 connected into a circuit (not shown) which has as a part thereof a meter which may deflect in either direction from a zero center to reflect changes in induced voltage. This meter may be calibrated in thousandths of an inch, for example, since deflection of the meter will be directly proportionate to the movement of the core.

To more fully describe the operation of the height gage, reference is again had to FIG. 4. The height gage is mounted on a stand through mounting hole 12, the stand being placed on a surface plate. The height or dimension to be compared is built up with gage blocks of known values and the spherical portion 14 of contact pointer 13 is brought into engagement with the top of the blocks. An upward pressure on the portion 14 will cause the contact pointer 13 to be deflected upwardly or in a clockwise direction around the pivot point formed by reeds 19 and reed 20. This, in turn, will cause that portion of gaging lever 15 which is in channel 17 of body 11 to also rotate in a clockwise direction and draw down with it core 24. The meter (not shown) will indicate the deflection caused by the induced voltages in transformer 27 and, by adjusting the gage head on the stand, the meter may be roughly brought to the zero position and secured in that position. To precisely zero the meter, knob 29 is rotated in the proper direction which, through shaft 28 and worm 31, rotates worm gear 33. Worm gear 33, fast on shaft 32, thereby rotates cam 34. The adjusting pin 35 which rides on the cam will be moved towards or away from the center of shaft 32, depending upon the segment of the cam surface on which pin 35 is then riding. The movement of the pin towards or away from the center of shaft 32 rotates cap 25 about cut away section 36 and thereby moves transformer 27 with relation to core 24. As described hereinabove, relative movement of the transformer with relation to the core causes a change in the deflection of the meter. In this manner, by rotating knob 29 in the proper direction, the meter may be zeroed with extreme accuracy. Thereafter, the gage head may be moved so that the spherical portion 14 is brought into contact with the part to be measured or compared and the portion 14 may be moved along the surface to be checked. Any deflection of spherical portion 14 in the vertical direction upward or downward will be transmitted through the pivot formed by reeds 19 and reed 20 to gaging lever 15 which will thereby move core 24 with relation to transformer 27. Through the differential transformer, the deflection or variation in the surface being measured can be read directly from the meter.

In order to provide positive contact of spherical portion 14 with a surface to be measured, whether the surface is to be contacted from above or below, means are provided for increasing the gaging pressure in both directions. Referring now to FIGS. 4 and 5, a shaft 41, is rotatably mounted in body 11. Projecting therefrom in channel 17 and parallel to gaging lever 15 is a resilient member 42 formed from music wire or other suitable material. Attached to gaging lever 15 and projecting horizontally therefrom is a stud 43 having a hole 44 therein. The outer end of resilient member 42 passes through hole 44. Mounted on the end of shaft 41 and positioned adjacent the right side of body 11 is a pressure pointer 45. A screw 46 longitudinally engages shaft 41 at its end opposite to the mounting of pressure pointer 45. A spring washer 47 mounted between body 11 and screw 46 applies sufficient frictional pressure to cause shaft 41 to remain in the position to which it is rotated by means of pressure pointer 45.

Referring particularly to FIGS. 1 and 4, it will be seen that rotation of pressure pointer 45 in the clockwise or normal direction will rotate shaft 41 in the same direction. This will place an upward force on stud 43 through resilient member 42 and will tend to rotate gaging lever 15 in the counterclockwise direction. From this it may be easily seen that a downward pressure is thereby placed on contact pointer 13 to keep spherical portion 14 in contact with the measured surface. If the surface to be measured is approached from underneath, pressure pointer 45 may be rotated in the counter-clockwise direction or reverse direction thereby placing an upward force on contact pointer 13 to insure contact of spherical portion 14 with the work piece. It is important to note that the pressure loading of gaging lever 15 in no way effects the displacement of gaging lever 15 and core 24 attached thereto.

One safety feature against excessive deflection of contact pointer 13 through slippage of the contact pointer with relation to gaging lever 15 has been heretofore described. A further safety feature to prevent excessive downward deflection may be seen in FIG. 4. A screw 51 screwed into body 11 projects into channel 17 and is positioned to limit the upward travel of gaging lever 15. The projection of screw 51 into channel 17 may be readily adjusted. A further safety feature may be seen in FIG. 5. A pin 52 is secured in body 11. The pin enters a large hole 53 in gaging lever 15. The pin does not normally contact any of the walls of hole 53, thus allowing gaging lever 15 to freely deflect in the clockwise or counterclockwise direction. However, if excessive vertical pressure is transmitted to gaging lever 15, the gaging lever will be prevented from deflecting an amount which may be harmful to the instrument by engagement of the walls of hole 53 with pin 52.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limting sense.

It is also to be understood that the following claims are intended to cover all of the generic and specific features of the invention herein described, and all statements of the scope of the invention which, as a matter of language, might be said fall therebetween.

What is claimed is:

1. An indicating device for checking the dimensions on a workpiece comprising a body, a contact lever, a plurality of reeds attached between said contact lever and said body to deflectably mount said contact lever to said body, a variable transformer having a core and a coil, said core being mounted on said contact lever, said coil being slidable, a flexible arm attached to said body and carrying said coil, and cam-zeroing means mounted in said body and acting on said flexible arm to vary the position of said coil without affecting the position of said core for adjusting said variable transformer to balance the induced voltages in said variable transformer when said contact lever is at a known position.

2. The structure defined in claim 1, wherein said reeds are mounted in two perpendicular planes to provide for deflection of said contact lever with relation to said body in a third perpendicular plane only.

3. The structure defined in claim 1 wherein said coil comprises a primary winding, a first secondary winding, and a second secondary winding, said primary winding inducing voltages in said secondary windings in proportion to the proximity of said core to each of said secondary windings.

4. The structure defined in claim 1 wherein said cam controlled zeroing means comprises a first shaft rotatably mounted in said body and having one end projecting therefrom, a knob attached to the projecting end of said first shaft, a worm mounted on said first shaft, a second shaft rotatably mounted in said body perpendicular to said first shaft, a worm gear mounted on said second shaft and engaging said worm, a cam mounted on said second shaft, and cam follower means cooperatively attached to said variable transformer and engaging said cam for adjusting the position of said variable transformer as said knob is rotated.

5. A zeroing mechanism for an electrically readable indicating device comprising a body, a cap mounted on said body along one edge of said body, said cap having a cut-away section therein extending the entire length of said cap near said mounting edge, a transformer mounted on said cap and slidably positioned within said body, a cam follower attached to said cap, a first shaft rotatably mounted in said body and having one end projecting therefrom, a knob mounted on the projecting end of said first shaft, a worm mounted on said first shaft, a second shaft rotatably mounted in said body perpendicular to said first shaft, a worm gear mounted on said second shaft, a cam mounted on said second shaft adjacent to said worm gear, said cam positioned to be contacted by said cam follower, said cap being positionable towards and from the center line of said second shaft by engagement of said cam follower with said cam as said knob is rotated, said cap pivoting about said cut-away section.

6. An indicating device for checking the dimensions of a workpiece comprising a body, a contact pointer, a gaging lever attached to said contact pointer, a plurality of reeds attached to said gaging lever and said body, said reeds mounted in two perpendicular planes to provide for deflection of said contact pointer with relation to said body in a third plane perpendicular to said first-mentioned planes, a variable transformer movably positioned in said body, said variable transformer comprising a primary winding, a pair of secondary windings and a core positioned adjacent to said secondary windings, said core mounted on and controlled by said gaging lever, a flexible cap attached to said body, said transformer being attached to said cap, a first shaft rotatably mounted within said body and having one end projecting therefrom, a knob attached to the projecting end of said first shaft, a worm mounted on said first shaft, a second shaft rotatably mounted in said body perpendicular to said first shaft, a worm gear mounted on said second shaft and engaging said worm, a cam mounted on said second shaft, and a cam follower attached to said cap and engaging said cam for adjusting the position of said secondary coils with relation to the said core as said knob is rotated.

7. The structure defined in claim 6 and further including means for pressure loading said gaging lever for maintaining said contact pointer in engagement with the work piece.

8. The structure defined in claim 6 and further including a rod mounted in said body perpendicular to the plane of deflection of said contact pointer, said rod being rotatably settable at any position, an indicator attached to one end of said rod for rotating said rod and indicating the position thereof, a spring perpendicularly attached to said rod and extending parallel to said gaging lever, and a spring stud having a hole therein attached to said gaging lever, the free end of said spring passing through said hole in said spring stud.

9. Zeroing means for an electrically readable indicating device operated by a transformer having a primary coil, a pair of secondary coils and a movable core comprising a body in which the transformer is movably positioned, a flexible cap attached to said body, said transformer being attached to said cap, a first shaft rotatably mounted within said body and having one end projecting therefrom, a knob attached to the projecting end of said first shaft, a worm mounted on said first shaft, a second shaft rotatably mounted in said body perpendicular to said first shaft, a worm gear mounted on said second shaft and engaging said worm, a cam mounted on said second shaft, and a cam follower attached to said cap and engaging said cam for adjusting the position of the secondary coils with relation to the core by flexing said cap as said knob is rotated.

References Cited in the file of this patent

UNITED STATES PATENTS

| | | |
|---|---|---|
| 1,466,664 | Lowe | Sept. 4, 1923 |
| 2,545,881 | Graham | Mar. 20, 1951 |
| 2,564,221 | Hornfeck | Aug. 14, 1951 |

FOREIGN PATENTS

| | | |
|---|---|---|
| 408,236 | Great Britain | Mar. 29, 1934 |